[19] United States Patent 
Walker

[11] 3,926,805
[45] Dec. 16, 1975

[54] DISTRIBUTION INLET SYSTEM WITH AUTOMATIC TANGENTIAL-GATE ADJUSTMENT

[75] Inventor: James Donald Walker, Aurora, Ill.

[73] Assignee: Peabody Galion Corporation, New York, N.Y.

[22] Filed: Mar. 9, 1973

[21] Appl. No.: 339,900

[52] U.S. Cl. .............................. 210/101; 210/519
[51] Int. Cl.[2] ......................................... B01D 21/24
[58] Field of Search ......... 210/49, 83, 84, 101, 121, 210/123, 128, 343, 519, 520, 97, 104, 129, 205–209; 137/101.25, 101.27, 101.29, 118

[56] References Cited
UNITED STATES PATENTS

| 2,205,199 | 6/1940 | Hubbell et al. | 210/520 |
| 2,635,757 | 4/1953 | Walker | 210/528 X |
| 3,227,278 | 1/1966 | Johnson | 210/519 X |
| 3,473,665 | 10/1969 | Duff | 210/519 X |
| 3,770,131 | 11/1973 | Davis et al. | 210/519 |

Primary Examiner—Thomas G. Wyse
Attorney, Agent, or Firm—Darbo, Robertson & Vandenburgh

[57] ABSTRACT

In a distribution inlet system which is especially suitable for distributing inflow from an entry chamber evenly between spaced points with agitation produced at each point within a predetermined range, tangential gates are made automatically adjustable. This minimizes variations in the height of the water level in the entry chamber, thereby reducing objectionable upstream conditions. It also achieves greater constancy in agitation, and especially in the over-all rotary movement often desired, as for example in a distribution chamber for a clarifier. The tangentially disposed or deflector gates, such as have heretofore been manually adjustable, are, according to the present invention, automatically shiftable. They may be yieldable resiliently to open wider with increased pressure, or may be float-controlled, or may be controlled by a plurality of such features acting cooperatively. A high degree of uniformity between different gates is achieved, or complete uniformity with gang-control.

12 Claims, 9 Drawing Figures

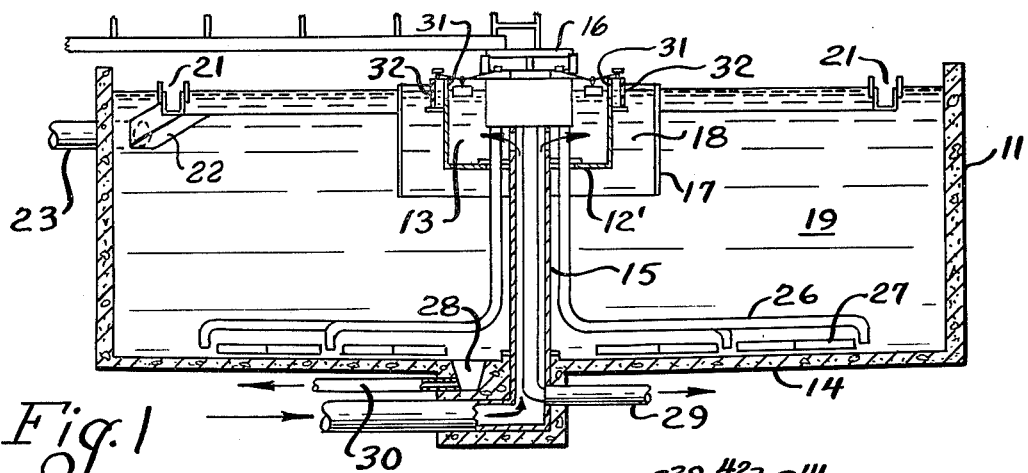
Fig. 1
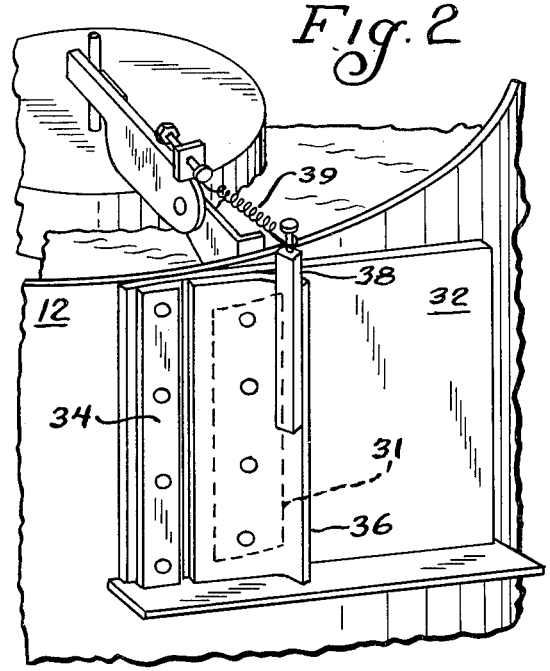
Fig. 2
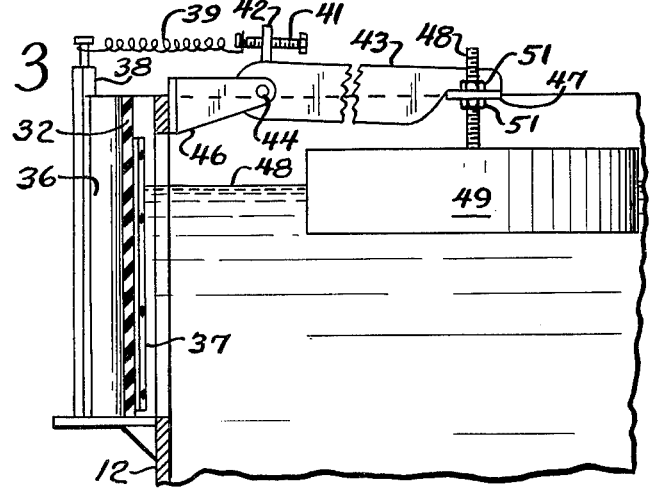
Fig. 3
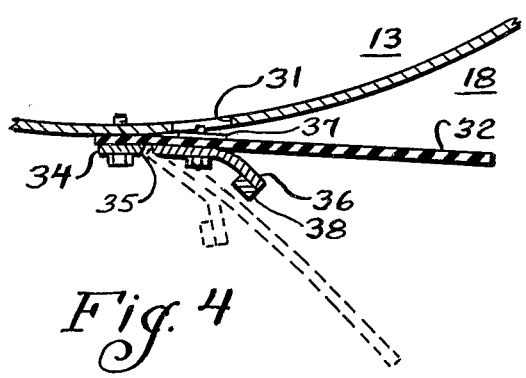
Fig. 4
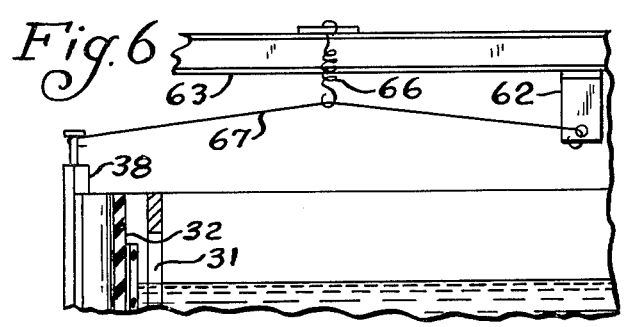
Fig. 5
Fig. 6

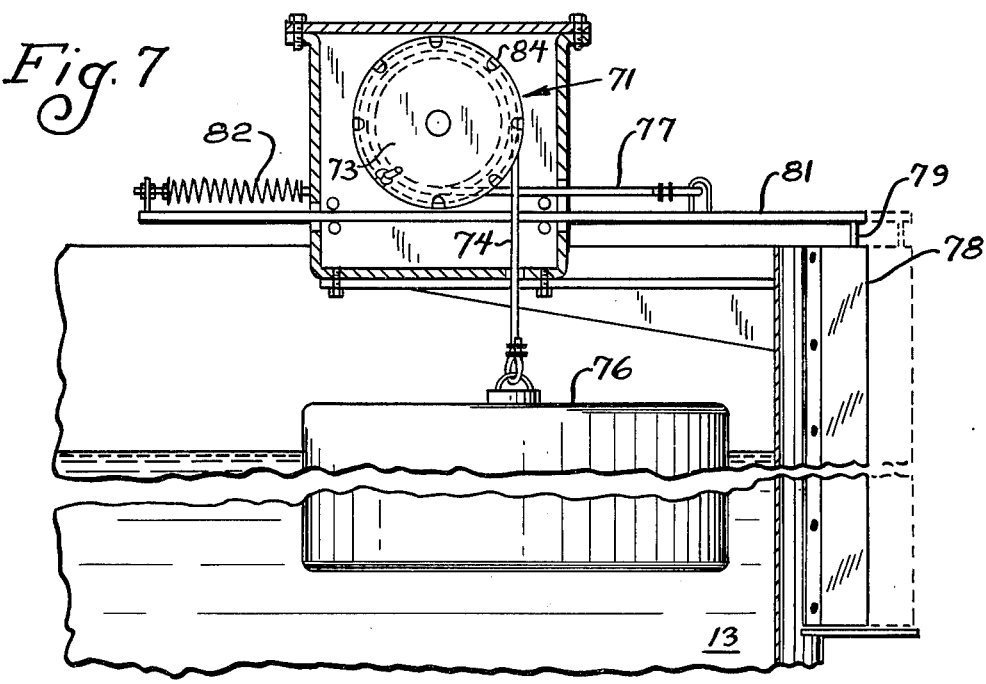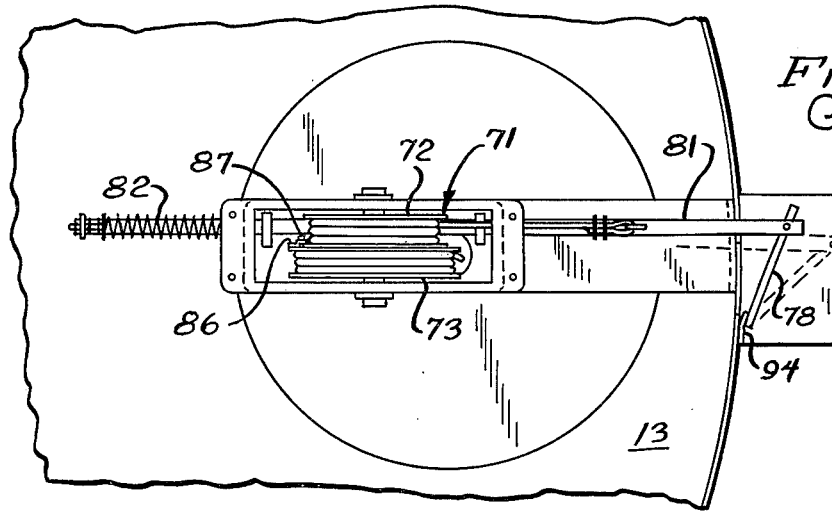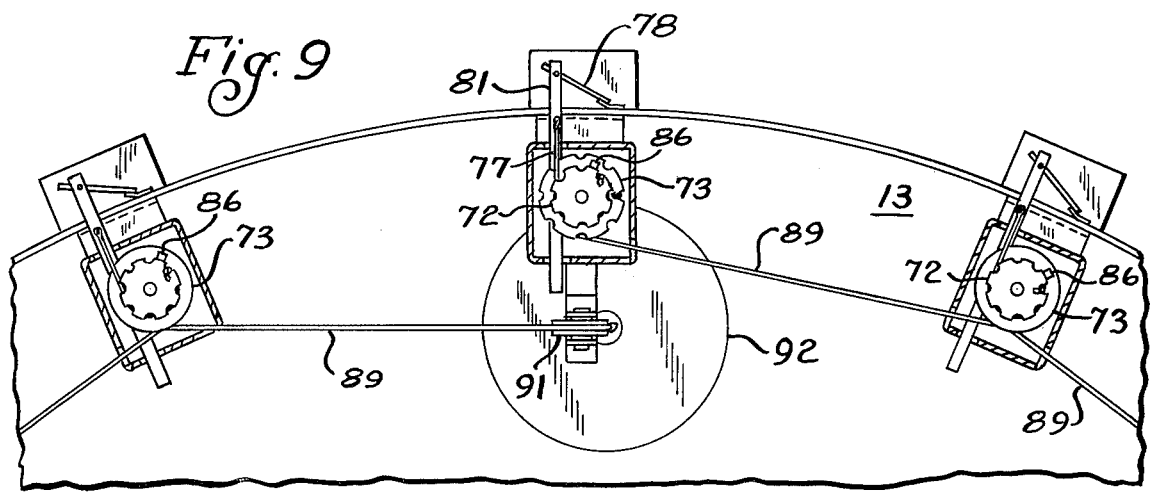

DISTRIBUTION INLET SYSTEM WITH AUTOMATIC TANGENTIAL-GATE ADJUSTMENT

INTRODUCTION

The invention of which the present disclosure is offered for public dissemination in the event that adequate patent protection is available relates especially to distributed inflow of flocculent liquors such as are found in clarifiers used in water treatment and sewage treatment. An illustrative type of clarifier in which has been very popular and satisfactory for a number of years is one in which water to be clarified enters through a more or less central entry chamber or primary inflow section in a large circular tank, clear water being drawn off in one or more annular troughs at the surface near the periphery. The sludge or other sediment settling to the floor is separately removed. The inflow in this instance passes from the entry chamber through a surrounding annular distribution zone, and then flows, with the necessary uniformity and gentleness, beneath a skirt-like bottom edge of the outer wall forming this distribution zone.

The distribution zone is typical of situations with which the present invention is concerned. Without a proper distributional inlet system, there may be either excessive agitation which can tear apart flocs to be settled, or else the flow from the distribution chamber is very likely to be concentrated in one or more density-currents. The inflowing watery mixture is likely to have a slighly greater density than the contents of the tank as a whole, and this density accentuates a tendency that water has to channel, or concentrate its flow along any chosen course, even when density is uniform. Such density-currents or channeling were amazingly well reduced or eliminated under the present applicant's prior patents (U.S.A.) U.S. Pat. Nos. 2,635,757 and 2,635,758 by using deflectors to set up in the distribution chamber an over-all rotary flow together with relatively uniform minor local turbulence, suitable for flocculation, at all points. The deflectors were adjustable by manual adjustment to meet the varying flow rates. Usually flow was nearly enough uniform so that results could be tolerated without frequent adjustment, even though hardly satisfactory. Ideally, the plant operator would make adjustments perhaps twice a day, but rarely was this ideal achieved and long maintained. Where no adjustment is made, increased inflow necessarily raises the water level within the primary inflow chamber, inasmuch as the ports to the secondary chamber are necessarily somewhat constricted in order to make a sufficient head differential between the primary and secondary chambers to develop the necessary velocity of the stream's being deflected so that they will set up the necessary rotational and flocculating action. Any substantial raising of the water level in the primary chamber was always somewhat objectionable, at least in theory, because it was at best wasteful of the resulting energy and at worst caused too much rotation or too much agitation in the secondary chamber. In some plants, such raising of the water level in the primary inflow chamber is especially objectionable because the raising of the water level at points in the system upstream from the tank in question is objectionable. From the standpoint of over-all plant design it is often desirable that the design use as little as possible of the available total head loss in each stage of operation. If the water level in the primary inlet chamber of the clarifier can be kept nearly constant with reliability, the plant engineer can, in his designs, save a few inches of the available head at that point.

According to the present invention the deflector gates which have heretofore been adjustable only manually are made automatically adjustable so that they minimize water level variations in the entry chamber, and relatively constant rotational speed and turbulence in the secondary or distributional chamber. The self-adjustment may be by resilient yielding, by float control, or by a combination of these.

The objects and advantages of the invention will be appreciated more fully from the following description and from the drawings.

DESIGNATION OF FIGURES

FIG. 1 is a vertical sectional view of a portion of a clarifier in which the present invention is extremely useful.

FIG. 2 is a perspective view of one very simple form of the present invention.

FIG. 3 is a vertical sectional veiw of the structure shown in FIG. 2

FIG. 4 is a horizontal sectional view showing in full lines a normal position for an adjustable gate and in dotted line lines an extremely or even exaggeratedly wide-open position of the same gate.

FIGS. 5 and 6 are views of two extremely simple automatic gate controls of different types.

FIGS. 7 and 8 are views of a more sophisticated form of the invention, and

FIG. 9 is a fragmentary plan view showing gang-control of all of the gates to ensure uniformity between all of the gates, all automatically controlled.

INTENT CLAUSE

Although the following disclosure offered for public dissemination is detailed to ensure adequacy and aid understanding, this is not intended to prejudice that purpose of a patent which is to cover each new inventive concept therein no matter how others may later disquise it by variations in form or additions or further improvements. The claims at the end hereof are intended as the chief aid toward this purpose, as it is these that meet the requirement of pointing out the parts, improvements, or combinations in which the inventive concepts are found.

BACKGROUND DESCRIPTION

A typical clarifier suitable for use of this invention may include a huge concrete tank 11 having near its center a cylindrical wall 12 (usually steel) providing with its bottom 12' a substantially separate primiary or entry chamber 13. The wall 12 is fixed, and bottom 12' may be supported from tank bottom 14 by a bridge 16 resting on inflow column 15, often called a pier, which discharges into entry chamber or section 13.

A cylindrical skirt-type of wall 17 surrounds the wall 12, being spaced from it to form a secondary or distribution chamber 18 which discharges into the main or clarification portion 19 of the tank 11. Sediment or sludge falls to the floor 14 and clarified water overflows into one or more annular collector troughs 21 from which it flows through a flume 22 to an outflow 23.

Conventionally a rotary collector diagrammatically illustrated as including suction pipes 26 and blades 27 withdraws constantly settled sludge from the floor with outflow at 29. A central trough 28 may also be provided, leading to normally closed or idle draw-off 30.

A plurality of ports 31 lead from primary chamber 13 into secondary chamber 18. The ports 31, being partially blocked by the deflectors 32, are sufficiently constricted so that the water level in primary chamber 13 will be appreciably higher than that in secondary chamber 18. This is necessary in order that the differential head will give the water flowing through the ports 31 a significant velocity. This will induce an over-all rotating action in the secondary chamber or section 18, which is an annular chamber in the illustrated form. Because the ports 31 are distributed at moderately frequent uniform intervals around the periphery of primary chamber 13, there will be a fairly uniform degree of gentle local turbulence, suitable for flocculation, throughout the chamber 18, especially in its upper portions. The rotating action and the turbulence together maintain the solids in uniform suspension and prevent the development of density currents or channeling. As a result, water flowing out of the bottom of chamber 18 has a quite uniform tendenccy to continue moving downwardly and gently outwardly, the downward movement of course being terminated at or approaching the floor 14.

AUTOMATIC GATE ADJUSTMENT OF THE PRESENT INVENTION

According to the present invention, the deflector gates 32 are automatically adjusted, as need requires, to approach ideal settings at all times. The control means illustrated are more for illustrating the principle than for indicating a preference for any particular type of control means. Probably any means for moving the gates further open and further closed as the water level in the primary chamber 13 rises and falls will be a substantial improvement over the prior manual adjustment. The design or adjustments for gate 32 should be preferably be such that its position will be ideal for a most common or chosen water level within the primary chamber 13. In that event any opening or closing from that ideal position as the water level in chamber 13 fluctuates will be closer to ideal than if that one initial position were maintained constant. The present invention further contemplates that the adjustments will be reasonably close to ideal for all levels to be encountered.

In FIG. 2, the gate 32 may be a single piece of resilient flexible material such as reinforced neoprene rubber. Along one vertical edge it may be secured firmly to the tank by a clamp plate 34 secured by suitable screws or bolts to the cylindrical wall 12. A stiffener plate 36 lies adjacent to the clampl plate 34 and may be secured to the gate 32 by a clamp plate 37. At least one of plates 34 and 36 is chamfered as at 35 to allow a simple hinging action by a flexing of the gate 32 along a line between the two closely spaced plates 34 and 36.

The plate 36 has upstanding from it a biasing or control post 38. A spring 39 is stretched between the post 38 and the grooved tip of an adjustment screw 41. The adjustment screw 41 is threaded through an upstanding arm 42, which is part of a bell crank lever having another arm 43. The bell crank lever 42, 43 is pivoted by spindle 44 to a bracket 46 mounted on cylindrical wall 12 as by welding.

The arm 43 is provided with a flange 47 through which a rod 48 extends, the rod 48 carrying a float 49. The height of the float 49 with respect to the arm 43 can be adjusted by nuts 51 threaded on rod 48.

If we assume that screw 41 is adjusted to give gate 32 an ideal positioning with the water level as shown at 48 in FIG. 3, a rise in that water level has a three-way gate-opening action. By one action, the increased pressure or total force exerted on gate 32 by the water at its raised level will have some stretching effect on spring 39, this allowing the stiffener plate 36 and gate 32 to swing slightly further outwardly, so that the water level 48 does not rise as high as it otherwise would.

In addition, both the increased total pressure on gate 32 and the rising water level 48 raise the float 49 so that it shift outwardly the inner end of spring 39, thereby further opening the gate 32 and further reducing the rise of water level 48.

An optional effect (avoidable if a rigid gate material is chosen) is that the increased total pressure on the inner face of gate 32, especially where it is impinged by the outflow from port 31, may slightly flex the gate 32 thereby wrapping it slightly around the curved portion of stiffener plate 36. This again may slighly increase the ease of flow of water through the port 31 and reduce the amount of rising of surface level 48.

It should be observed that the outward swing of gate 32 not only increases the ease of flow of water through the port 31, but also changes the average direction of outflow of water deflected by the gate 32. Thus in FIG. 4, the full-line position of gate 32 deflects its water stream so that it leaves in a tangential direction such as will have maximum effect in causing rotation of the water in the outer chamber 18. With the gate 32 moved toward the dotted line position in FIG. 4, the outflow from port 31 would be more nearly radial so that, except for its increased volume of flow, it would be less effective in causing rotation of the body of water in chamber 18. Ideally, the two changes would counterbalance each other so that the rotational speed of water in chamber 18 would remain nearly constant.

Although a pivot type hinge could be used for the gate 32, the illustrated hinging by flexible or resiliently flexible material is preferred inasmuch as it substantially eliminates hinge friction. It is desirable that the material used for the flexible-material hinging be one which does not acquire a permanent set. A temporary set, such that after each change the position of the gate 32 might be influenced by the set for a few minutes or even for half an hour is relatively unobjectionable inasmuch as changes in flow conditions in a treatment plant are rarely so abrupt that the response or automatic adjustment of the gate needs to be completed more promptly than this. Likewise, if the gate 32 is allowed to wrap slightly about the curvature of stiffener plate 36 the absence of a changing permanent set is again desirable. Here, however, it may be more important that there be not even any temporary change of set, or at least not even temporary loss or reduction of bias toward returning to the predetermined ideal shape such as flatness.

Although the form of the invention illustrated in FIGS. 2 to 4 benefits from three types of opening action, any one or two of them would be an improvement as compared to the prior semipermanent manual settings. Thus the spring 39 could have its anchored end either permanently immovable or movable only by screw adjustment, instead of being moved in response to action of float 49. Likewise, the spring 39 could be replaced by a nonyielding link, and the opening action would be only that resulting from upward movement of float 49. Of course, this separate movement would still result from a two-way action, namely the raised water level 48, and the greater pressure on gate 32 which would make float 49 be slightly less submerged.

The float 49 must be a fairly heavy float so that with the mechanical advantage between the length of arm 48 and the length of the other bell crank arm represented by pin 42 the maximum pressure on gate 32 will not be able to raise float 49 entirely out of the water. It could work out best that the float 49 is a float only in the sense that it floats with the aid of the upward pull exerted on it through spindle 48, arm 43, arm 42, spring 39 and the pressure of the water on gate 32. Even a lead weight, if the forces mentioned were such as to suspend it only partially submerged, would respond to the rising water level, and could be a float (or at least a float-like member) in this sense. Of course, a desire to displace a large amount of water to provide a large increase of thrust from greater submergence points to the use of a fairly large float; hence the use of a lead float-like member is likely to be inappropriate for that reason. On the other hand, a float-like member heavier than the water it displaces could prove desirable. Also, a moderately small cross-section at and near the water level may be found desirable, to let the increased pressure of water on the gate produce appreciably less submergence.

An exceedingly simple type of gate control system is illustrated in FIG. 5. Here the float 49 is suspended at approximately a midpoint of a catenary cable 61 strung between an anchor lug 62 on bridge 63 and the post 38 of gate 32. As the water level 48 rises, it lifts or applies increased upward thrust to float 49 and applies increased outward thrust on gate 32. The latter tends to make the float 49 ride higher with respect to the water level 48, but this tendency is offset by the straightening of catenary cable 61. If the straightening of the illustrated catenary is found to have too much influence, the two ends of catenary cables 61 can be raised so that the catenary has a deeper sag and then a decrease in that sag will be less influential. Of course, the cable could simply run from post 38 around a pulley above the float 49 and directly down to the pulley. This avoids any catenary influence. The necessary increased bias on gate 32 to resist a higher water pressure on it results from a reduced submergence of the float.

It is possible to control not only the clearance of the deflector from the outer face of wall 12 but also the effective size of the port 31 itself. Thus in FIG. 4 the clamping bar 37 is illustrated as in a position reducing the effective size of port 31. The clamping plate 37 is in effect a partial stopper, not a mere deflector. By proper choice of its size with respect to the size of port 31, it could have a very marked effect in the rate of flow with slight changes of the water level 48. Although some of the benefits of this invention could be obtained by using a fixed deflector plate and variably stoppering or valving the ports 41, control by moving the deflector plates is preferred so that an increased volume of flow through the ports will be offset by reducing its relative efficiency in rotating the body of water in distribution chamber 18.

FIG. 6 illustrates a simple variable bias for gate 32 which can be quite helpful without a float. Gate 32 needs a substantially stronger bias as the water level rises. Not only does the water exert pressure over a larger area of the gate, but also the average differential pressure per square inch is increased, unless the level in the distribution chamber 18 rises as much as that in the entry chamber 13. The system shown in FIG. 6 increases the bias on gate 32 as it moves outwardly both because the spring 66 is increasingly stretched and because the catenary strand 67 is becoming increasingly effective as to the horizontal force it exerts as the catenary approaches a straight line.

In deciding which type of biasing to use, and in choosing values for it, it may be helpful to calculate or measure the net thrust of water on the gates at the extreme conditions expected (perhaps excluding very temporary or abnormal conditions) and choose a design and values which will come close to providing a bias just equalling these thrusts at the intended gate positions for the two thrusts. Another method is to manually set the gates for best results at extreme or widely differing conditions, measure the movement required between the two positions and the forces at each, and design the system to give this movement and those forces. If substantial rise of the level in the entry chamber 13 is to be tolerated, design may be easiest using no spring and a large heavy floatlike member that will have about the same submergence at both positions, designing the invariables to give the required length of movement with the corresponding rise of level in the entry chamber 13. The ratio of movements can be made adjustable, as by varying the effective length of arm 42. Fixed or adjustably fixed limits in each direction of gate movement can be provided, if any extreme but rare conditions would move the gate too far.

FIGS. 7 and 8 show a form of the invention which, so far as the inventor knows, is the best yet contemplated. The most distinctive feature of this form is a differential drum set 71 which, as seen best in FIG. 8, includes a drum 72 of smaller diameter and a drum 73 of larger diameter. As is most clear in FIG. 7, a strand 74 is wound on the drum 73 and supports a heavy float 76. A strand 77 is wound on smaller drum 72 so that under influence of the weight of float 76 it draws inwardly on gate 78. Although strand 77 could be connected directly to pin 79 extending up from gate 78, the present preference is to have a draw bar 81 intervening. This permits the use of a spring 82 which urges the draw bar 81 in an outward direction, the direction which tends to open gate 78. Although this is in contrast to the other forms of the invention, and requires the float 76 to exert more downward pull than would otherwise be the case, that is at present deemed advantageous. Spring 82 tends to overcome friction which might otherwise cause the gate 78 not to open as widely as it should. Expressed differently, it permits the use of a float 76 large enough and heavy enough so that its degree of submergence is relatively independent of the slight friction of the system.

Although the gate closing strand 77 has been shown wound on the smaller pulley 72, it could be wound on the larger pulley 73 and the strand 74 on the smaller pulley. Tests have not yet been performed to decide which is best or the ideal ratio of the pulley sizes, or whether they should be of the same size.

The present intention is to use heavy monofilament nylon for the strands 74 and 77. The end of each strand can be knotted and secured in a peripheral notch of its drum. Preferably notches 84 are provided at frequent intervals around the periphery of a drum flange available to each drum. For clarity of illustration, the drum face exposed in FIG. 7 has been illustrated as provided with such notches. So that clearance will not have to be provided for the notch, it may be preferable to notch the inner flange of the larger drum, the flange adjacent the smaller drum. Then each of the cords can be anchored in notches of this flange, different notches preferably being used. Of course, each strand is wrapped around the drum far enough so that it will never unwind from the drum sufficiently to cease having an inward component of pull in the notch.

It is considered very important that the various gates 78, or the gates 32 of the other figures, be opened equally, and retain equality through their various automatic adjustments. It is hoped that the forms of FIGS. 2 to 6 will be sufficiently frictionless so that this will be accomplished. It is also hoped that in FIGS. 7 and 8 which may have slightly more friction due to the drum spindle and the draw bar 81 (though all such friction is low) there will be enough power from the float 76 to provide uniformity of movements.

A very simple adjustment for each gate at any given time is provided in FIGS. 7 and 8 in the form of flange clamp 86 which includes a screw 87. By slightly loosening the screw 87, the two drums 72 and 73 may be shifted rotatively with respect to one another. This adjusts the position of the gate 78 for the then existing level of the liquid in entry chamber 13. By thus adjusting all of the gates, when the liquid is at a most commonly encountered liquid level, they can be adjusted to exact uniformity. Then any departures from equality as they all move will be no worse than minor.

Unless satisfactory uniformity of gate opening is achieved with independent control of each gate as is characteristic of all of the forms described so far, a ganging of the gates to be controlled by a single float will be preferred. One form of that ganging is illustrated in FIG. 9, using the differential pulleys of FIGS. 7 and 8 but with these pulleys shifted to have vertical axes instead of horizontal axes. Thus as seen in FIG. 9 each of the gates 78 is drawn in by a strand 77 wound on the smaller drum 72. Each of these drum is locked to a larger drum 73 on which is wound a float-controlled strand 89. However, all of the drums 73 are controlled by the same float 92. Thus strand 89 may be assumed to be wrapped around and anchored to a "first" drum 73 (at the center position in FIG. 9), then wrapped around the drum 73 to the right and then successively wrapped around each other drum 73 until it has been wrapped around all of the drums 73, the last of which is shown at the left in FIG. 9. From this drum it would pass over a pulley 91 to extend downwardly to float 92 which would thus control all of the drums 73 and through them all of the gates 78 with exact uniformity in all of their movements. Each drum has a clamp 86, so that its clamp screw can be loosened and the position of its control gate 78 be set. In this instance the equality of movement of the gates is so certain and exact that the gates may be set for equality of positioning at any time, without any need to do so at a time when the liquid level in the entry chamber is at a normal position.

Of course the float 92 may be considerably larger and heavier than the float 76, since the float 92 will control all of the gates, and must be heavy enough to pull all of them in as the water level in entry chamber 13 lowers. Although the slide bars 81 have been illustrated in FIG. 9, and springs 82 may turn out to be desired, it is believed that by making the gates sufficiently frictionless so that they never allow slack in strands 77 to remain long, better results will be achieved by having the strands 77 connected directly to the gate 78 or to its control pin 79, and omitting bars 81. Also the bar 81 and spring 82 could be provided at only the "first" gate (the center gate in FIG. 9) for overcoming any friction in all of the drum sets and pulley 91 as the float 92 rises.

In FIG. 9, the drums 73 habe been shown unnotched, except the center or first drum. This gives a pictorial clue to the fact that strand 89 is continuous. Actually, the drums would probably all be alike (notched) if only as a matter of economy. Furthermore, unless experience shows there is no slippage or creepage on the drums, it would be safer to use separate lengths of strand 89 between successive pairs of drums, with each length anchored to each drum.

In FIGS. 7 to 9 a relatively rigid gate 78 has been indicated, fiberglass being a suitable material for this gate. It may be hinged in a substantially frictionless manner by a neoprene hinge 94. The spindles for the drums may be made nearly frictionless by known bearing techniques. It is contemplated that although the drums, or at least one drum, can turn with respect to the spindle, the drums will normally turn with the spindle.

ACHIEVEMENT

From the foregoing it is seen that a great improvement can be made in inflow systems supplying and energizing a distribution or flocculation chamber by having deflector gates automatically controlled so that fluctuations in the water level upstream of the gate are greatly reduced and variations in the rotating or flocculating action in the distribution chamber are also reduced. It is not necessary that the range of inflow rates which can thus be accommodated be extremely high. The ability to accommodate without excessive variation of level an inflow variation of two to one will take care of the great majority of present needs. Accommodation of a four to one variation would be sufficient for all needs now known. The present invention can very easily accommodate a two to one variation, and with sufficient care in design can accommodate a four to one variation.

A two to one variation would cause a quadrupling of the differential head, with fixed-aperture gates, somewhat less with gates in which more of the upwardly extending flow area is used at higher flow. With the present invention, the change of differential head should be held to no more than a 50% increase, when the flow doubles. A 100% increase would be deemed a poor use of the invention. Thus with a 4 inch differential head at low flow there should be only a 6 or 8 inch differential head at double this flow; and the fine scale turbulence in the flocculation chamber 18 should stay within the range between inadequate floc aggregation and floc disintegration. Floc disintegration should be avoided because it tends to produce nonsettleable particulates. Depending on what is being processed, it may be desirable that the fine scale turbulence be kept in the range described as having a G value of the order of 25 to 50 sec.$^{-1}$, or with stronger flocs up to 75 sec.$^{-1}$.

From a practical standpoint, use of this invention results in a clearer effluent, on the average. Although in theory the prior gates could be adjusted often enough to achieve the same result, it was probably never done where the inflow fluctuation was substantial and frequent. With the present invention, and proper care in designing (especially when aided by experience not yet available), it will be possible to have the gate settings ideal at all times. If there may be occasions when ever the most restricted position of the gates would not achieve sufficient agitation for satisfactory or optimum flocculation, recirculation from the flocculation chamber, or downstream from it, into the entry chamber can be provided, as by an air lift pump automatically actuated when the water level in the entry chamber falls to be a predetermined minimum height.

The foregoing achievements are not confined to the type of tank shown in FIG. 1. For example, if the flocculation chamber does not surround the entry chamber, the over-all rolling action may be on one side of the entry chamber; or an entry chamber could lie between, and feed, two flocculation chambers.

The use of drums may not be universally regarded as the preferred form. Even with ganging, a more nearly frictionless system can be worked out, as by attaching an anchored catenary strand to each gate and coupling all of the midpoints by other strands, biased at the end of the series. The frictionless characteristic tends to ensure the same gate positions for respective levels whether the level is rising or receding. With equality ensured by ganging, a frictionless system can be highly sensitive; and any desired pattern of gate movement can be achieved by selecting a corresponding size, perhaps with vertical variations or contouring, for the part of the weight or float which moves through the surface of the water. This portion of the weight or float may be a readily replaceable tower upstanding from the main body which hangs entirely submerged suspended by a mere strand. The ganging of the gates here contemplated can also be achieved by direct connections between the control pins on the gates, or between arms extending approximately radially from the gates near the hinges, with one gate automatically controlled to close all of the others equally.

I claim:

1. A distribution inlet system for a flocculation chamber and the like and which may be used with varying rates of liquid inflow into the inlet system, including an entry chamber provided with means for supplying the inflow liquid to be distributed, and connected to a flocculation chamber through a plurality of ports controlled by angularly disposed adjustable gates for constricting the flow area for flow through the ports and past the gates to ensure an effective velocity and for deflecting the flow to set up an over-all rolling action in the flocculation chamber; and automatic means for adjusting the gates to increase the flow area and decrease the angularity of deflection with increased inflow into the entry chamber.

2. A distribution inlet system for a flocculation chamber and the like and which may be used with varying rates of liquid inflow into the inlet system, including an entry chamber provided with means for supplying the inflow liquid to be distributed, and connected to a flocculation chamber through a plurality of ports controlled by angularly disposed adjustable gates for constricting the flow area for flow through the ports and past the gates to ensure an effective velocity and for deflecting the flow to set up an over-all rolling action in the flocculation chamber; and automatic means for adjusting the gates to increase the flow area and decrease the angularity of deflection with increased inflow into the entry chamber, said means including means yieldably biasing the gates toward their more closed condition with increasing biasing strength as the gates move toward their more open position.

3. A distribution inlet system for a flocculation chamber and the like and which may be used with varying rates of liquid inflow into the inlet system, including an entry chamber provided with means for supplying the inflow liquid to be distributed, and connected to a flocculation chamber through a plurality of ports controlled by angularly disposed adjustable gates for constricting the flow area for flow through the ports and past the gates to ensure an effective velocity and for deflecting the flow to set up an over-all rolling action in the flocculation chamber; and automatic means for adjusting the gates to increase the flow area and decrease the angularity of deflection with increased inflow into the entry chamber, said means including means yieldably biasing the gates toward their more closed condition with increasing biasing strength as the gates move toward their more open position, said ports being located to extend both above and below normal water level in the entry section so that any rising water level in the entry section applies pressure to more gate area.

4. A distribution inlet system for a flocculation chamber and the like and which may be used with varying rates of liquid inflow into the inlet system, including an entry chamber provided with means for supplying the liquid to be distributed, and connected to a flocculation chamber through a plurality of ports vontrolled by angularly disposed adjustable gates for constricting the flow area for flow through the ports and past the gates to ensure an effective velocity and for deflecting the flow to set up an over-all rolling action in the flocculation chamber; and automatic means for adjusting the gates to increase the flow area and decrease the angularity of deflection with increased inflow into the entry chamber, said means including a float-like member partially submerged in the entry section and in part at least controlling the gates to effectuate an increase of flow area as the water level in the entry section rises as a result of increased inflow.

5. A distribution inlet system according to claim 4, in which said means also includes means yieldably biasing the gates toward their more closed condition with increasing biasing strength as the gates move toward more open position, and in which the ports are located to extend both above and below normal water level in the entry section so that the rising water level applies pressure to more gate area.

6. A distribution inlet system for a flocculation chamber and the like including an entry chamber provided with means for supplying the liquid to be distributed, and connected to a flocculation chamber through a plurality of ports controlled by angularly disposed adjustable gates for constricting the flow area for flow through the ports and past the gates to ensure an effective velocity and for deflecting the flow to set up an over-all rolling action in the flocculation chamber; and automatic means for adjusting the gates to sufficiently increase the flow are and decrease the angularity of deflection wiht increased inflow into the entry chamber as to accommodate a doubling of the total inflow with not more than a doubling of the differential head on opposite sides of the gate.

7. A distribution inlet system according to claim 6 in which the automatic means has such characteristics that fine scale turbulence in the flocculation chamber is maintained in the range in which the G value is of the order of 25-50 sec.$^{-1}$.

8. A distribution inlet system for a flocculation chamber and the like including an entry chamber provided with means for supplying the liquid to be distributed, and connected to a flocculation chamber through a plurality of ports controlled by angularly disposed adjustable gates for constricting the flow area for flow through the ports and past the gates to ensure an effective velocity and for deflecting the flow to set up an over-all rolling action in the flocculation chamber; and automatic means for adjusting the gates to increase the flow area and decrease the angularity of deflection with increased inflow into the entry chamber; said means maintaining equality of flow through the respective gates at their various adjustments.

9. A distribution inlet system for a flocculation chamber and the like including an entry chamber provided with means for supplying the liquid to be distributed, and connected to a flocculation chamber through a plurality of ports controlled by angularly disposed adjustable gates for constricting the flow area for flow through the ports and past the gates to ensure an effective velocity and for deflecting the flow to set up an over-all rolling action in the flocculation chamber; and automatic means for adjusting the gates to increase the flow area and decrease the angularity of deflection with increased inflow into the entry chamber, said gates being ganged to ensure equality of their respective adjustments at their various adjustments.

10. An inlet and flocculation system for producing rotative action and mild turbulence in a body of floc-bearing liquid into which the inlet system discharges, including tank means forming entry and flocculation chambers separated by a common wall between them having a plurality of outflow parts through which the liquid flows from the entry chamber into the flocculation chamber, angularly disposed adjustable gates controlling said ports for constricting the flow areas for flow through the ports and past the gates to ensure an effective velocity and for deflecting the flow to set up an over-all rolling action in the flocculation chamber; and automatic means for adjusting the gates to increase the flow area and decrease the angularity of deflection with increased inflow into the entry chamber.

11. An inlet and flocculation system according to claim 10 in which the automatic means has such characteristics that, with a doubling of the inflow, the fine scale turbulence in the flocculation chamber is maintained in a range such that the G value is of the order of 25–50 Sec.$^{-1}$.

12. An inlet and flocculation system according to claim 10 in which the automatic means has characteristics such that the differential head on opposite sides of the common wall increases no more than 50% as the inflow doubles.

* * * * *